United States Patent [19]

Nam et al.

[11] Patent Number: 5,262,758
[45] Date of Patent: Nov. 16, 1993

[54] SYSTEM AND METHOD FOR MONITORING TEMPERATURE

[76] Inventors: Young K. Nam, 513 Seongnam-Dong, Seongnam City Kyunggi-Do; Seung J. Lee, Bupyung Apt. 9-203, 98-64 Bupyung 5-Dong, Buk-Ku Incheon, both of Rep. of Korea

[21] Appl. No.: 762,446

[22] Filed: Sep. 19, 1991

[51] Int. Cl.$^5$ .................. G08B 17/00; G01K 13/00
[52] U.S. Cl. ........................ 340/588; 62/129; 340/585; 340/691
[58] Field of Search .......... 340/588, 585, 309.15, 340/815.02, 815.03, 691; 364/557; 374/102, 104; 62/125-131

[56] References Cited

U.S. PATENT DOCUMENTS

| | | | |
|---|---|---|---|
| 3,594,752 | 7/1971 | Alton | 340/585 |
| 3,707,851 | 1/1973 | McAshan, Jr. | 62/125 |
| 4,109,527 | 8/1978 | Goode, Jr. | 374/142 |
| 4,114,442 | 9/1978 | Pratt | 374/113 |
| 4,283,921 | 8/1981 | Prosky | 62/126 |
| 4,286,465 | 9/1981 | Thomae | 374/104 |
| 4,443,851 | 4/1984 | Lin | 364/415 |
| 4,482,785 | 11/1984 | Finnegan et al. | 379/26 |
| 4,636,093 | 1/1987 | Nagasaka et al. | 374/186 |
| 4,718,776 | 1/1988 | Gilland et al. | 374/170 |
| 4,798,055 | 1/1989 | Murray et al. | 62/127 |
| 4,882,564 | 11/1989 | Monroe et al. | 340/588 X |
| 4,970,496 | 11/1990 | Kirkpatrick | 340/585 |
| 5,025,248 | 6/1991 | Bergeron | 62/129 X |

*Primary Examiner*—Thomas J. Mullen, Jr.
*Attorney, Agent, or Firm*—John C. Shepard

[57] ABSTRACT

A temperature monitoring system comprises a sensor for measuring the surrounding temperature, a timer for generating clock data, a controller for reading temperatures at predetermined intervals and storing selected temperature data and corresponding time data in memory, input switches for entering commands and data, a data display, and first and second alarm indicators. The controller operates in predetermined steps to activate the first alarm to indicate a current alarm condition and to activate the second alarm to indicate a past alarm condition. The controller selectively switches the display between normal and alarm modes to show differing time and temperature data depending on the temperature conditions monitored. The user may review alarm histories, including total alarm time and, for each past alarm period, maximum temperature, starting time and alarm duration, which have been calculated and stored.

28 Claims, 3 Drawing Sheets

SYSTEM AND METHOD FOR MONITORING TEMPERATURE

BACKGROUND OF THE INVENTION

1. Technical Field

This invention relates generally to temperature measurement devices and, more particularly, to a temperature monitoring alarm system and a method for operating such a system.

2. Background Art

In the prior art, temperature monitoring systems have been employed which continually monitor surrounding temperature. Temperature monitoring is often important in cooling, refrigeration or freezing units, where high temperatures might indicate a permanent or temporary failure of the total unit or a part thereof resulting in damage to refrigerated items, frozen goods or other commodities. For example, if the freezer compressor failed, or if the freezer coolant leaked, or if the freezer door was accidentally left open, or if some other unusual freezer condition existed, the frozen food stored within the freezer would thaw after a time. Once the food thawed, it would either have to be eaten immediately or discarded. Failure of the freezer could be discovered by activating a simple alarm. To determine if the food had remained frozen, had thawed, or had thawed and been refrozen, a history of the actual freezer temperatures would have to be analyzed. Various systems for activating an alarm or for collecting and reviewing temperature histories have been constructed and are known in the prior art.

In recording systems, a permanent record would be made continuously on a paper roll or disk and the paper recording would be reviewed from time to time by the user. Such a system requires that the user actually interpret the temperatures and make a judgment as to whether the temperatures have fluctuated outside desired limits. This presents a problem if the record is lengthy or difficult to analyze.

To eliminate the need for periodic inspections by the user, simple alarm systems have been developed. In such systems, an alarm would activate whenever the measured temperature exceeded a user selected temperature and remain activated until reset by the user. In these systems, no analysis was made of the temperature fluctuations, so that relatively minor variations in temperature resulted in an alarm condition even when these variations probably would not indicate a failure or glitch of the monitored system.

To provide comprehensive analysis, systems have also been developed to provide automatic alarms upon the sensing of high temperatures and to store all temperature readings and log the date and time at which temperatures were taken. Thereafter, such systems can be interrogated to provide an average temperature as well as minimum and high temperatures.

Temperature monitoring and alarm systems found in the prior art generally are either too simple to provide sufficient data about the temperature history or are too expensive and overly sophisticated for easy and inexpensive operation. It should be sufficient to provide a simple summary of any error or alarm conditions without making a complete or lengthy statistical analysis of the temperature history.

SUMMARY OF THE INVENTION one or more of the problems as set forth above.

An object of the invention is to provide a small and inexpensive temperature monitoring and alarm system having simple displays and alarms and maintaining information in a compact format sufficient to analyze alarm conditions.

According to the present invention, a temperature monitoring system comprises a sensor for measuring the surrounding temperature, a timer for generating clock data, a controller for reading temperatures at predetermined intervals, and a data display including first and second alarm indicators with the controller operating in predetermined steps to activate the alarms to indicate current and past conditions and to switch the display between normal and alarm modes to show monitoring information depending on the temperatures measured.

Another object of the invention is to present easily interpreted alarms, namely, a first alarm to indicate that the measured temperature is currently too high and a second alarm to indicate that the temperature previously was too high for too long a time.

It is a further object of the invention to simply summarize the necessary data as easily understandable information so that the user may review alarm histories on a visual output display, such historical information to include total alarm time and, for each past alarm event, maximum temperature, starting time and alarm duration, which have been calculated and stored.

In an exemplary embodiment of the invention, the temperature is read at scheduled intervals, compared with a selected temperature value, and if the temperature does not exceed the selected value and a past alarm event has not terminated, another scheduled temperature reading is made. If the temperature does exceed the selected value, the maximum stored temperature is updated, the current alarm indicator is activated, the alarm duration timer is started, and another scheduled temperature reading is made. When the temperature reading drops below the selected value, the current alarm indicator is deactivated, and if the alarm duration exceeds a selected time, the past alarm indicator is activated, the alarm start time, alarm duration time and maximum temperature are stored and the total time for all significant past alarm events is accumulated and may be later reviewed.

In a preferred embodiment of the invention, the current alarm indicator is deactivated when temperature drops and the past alarm indicator is deactivated only when reset by the user.

It is a feature of the invention to allow the desired temperature value to be entered by the user. It is a further feature of the invention to also allow the minimum time limit for an alarm indicating a significant past alarm condition to be entered by the user.

Another feature of the invention is that each past alarm period is assigned a sequential event number so that all data relating to that alarm period may be reviewed together.

Yet another feature of the invention is to automatically display appropriate temperature monitoring information on the display as required and to permit the user to request other temperature monitoring information as desired.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENTS

Best Modes for Carrying Out the Invention

Figure 1:
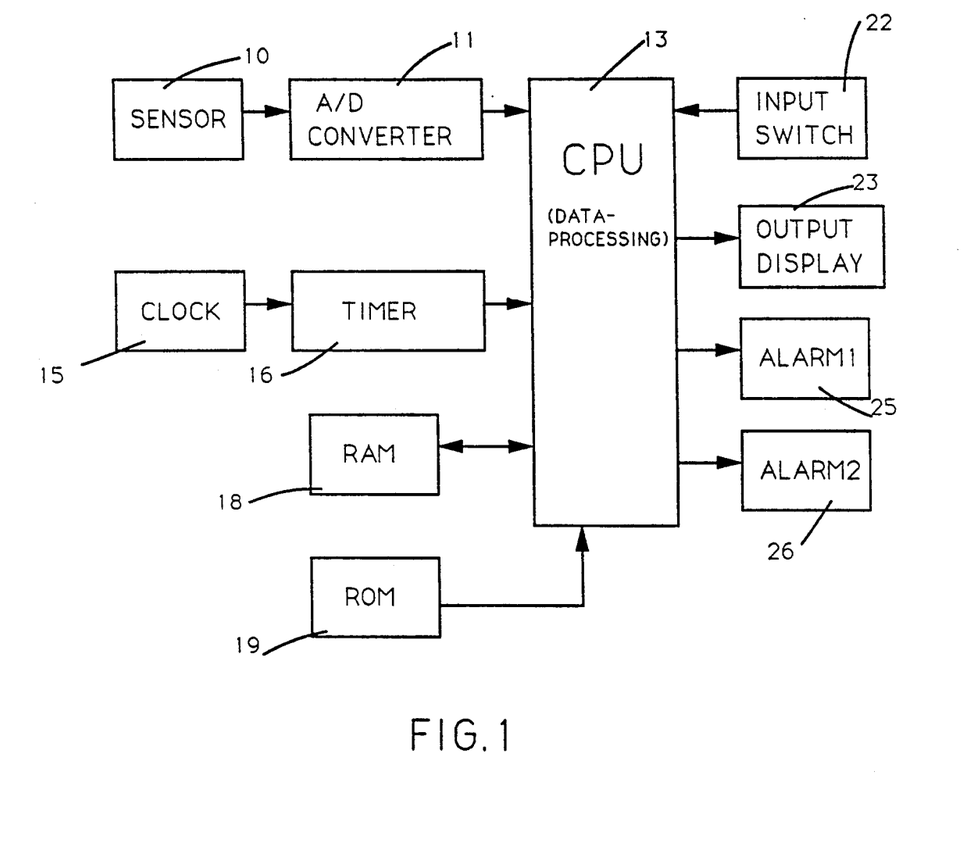
FIG. 1 is a functional block diagram of the discrete elements of a temperature monitoring system constructed in accordance with the present invention.
Figure 2:
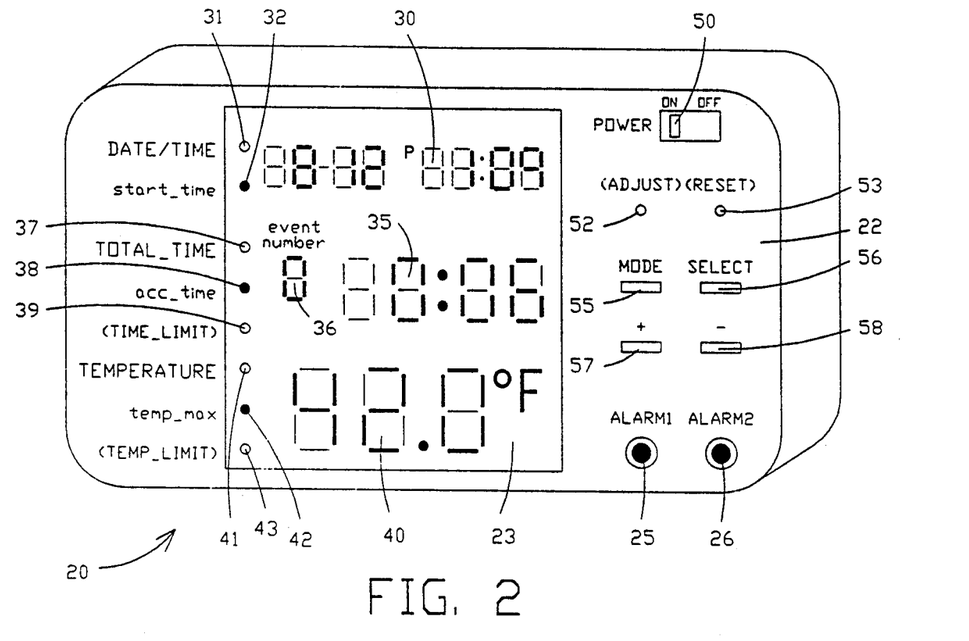
FIG. 2 is a perspective view of a control switch and display panel constructed in accordance with the present invention.

Referring to FIGS. 1 and 2 of the drawings, a temperature monitoring system is seen to generally include a temperature sensor 10, a central processing unit 13 connected to the temperature sensor 10 through an analog-to-digital converter 11, a clock 15 and timer 16, storage memory including random-access memory 18 and read-only memory 19, and a control switch and display panel, generally designated 20, with an input switch unit 22, an output display unit 23, and alarm indicators 25 and 26.

The central processing unit 13, or controller, which may be an electronic microprocessor, is programmable. The central processing unit 13 receives and interprets input data read from the temperature sensor 10 and the clock 15 and timer 16, compares and analyzes current and past temperature readings and time measurements, makes calculations, determines alarm conditions, and sends output data and alarm information to the storage unit or to a display as will be described in more detail hereinafter.

The input switch unit 22 is seen in FIG. 2 to be a group of functional input switches or toggles located on the front of the panel 20. It is understood that the switches may optionally comprise a numeric keypad or an alphanumeric keyboard. The input switch unit 22 is operatively connected to an input of the central processing unit 13 and enables the user to enter commands and data. As will be described in more detail below, the input unit 22 provides a convenient means for allowing the clock 15 and the timer 16 and the central processing unit 13 to be reset, for requesting display of stored and computed data, and for inputting preselected or desired temperature values.

The visual output display unit 23 is seen in FIG. 2 as an array of numeric LED or LCD read-outs and indicator lights located on the front of the panel 20. It is understood that the display may optionally comprise a full alphanumeric display terminal. The display unit 23 is connected to an output of the central processing unit 13 and is actively operated thereby. The display 23 provides a convenient means for viewing system data in readable alphanumeric characters. As will be described in more detail below, the display 23 is operated in two primary modes, a normal mode and an alarm mode, as well as a data entry or adjusting mode. The user from the display 23 may review stored and computed data including current temperature, starting times of past alarm events, accumulated times and maximum temperatures.

The storage memory, which includes read-only memory 18 and random-access memory 19, is operatively connected to the central processor unit 13 and provides a means for storing central processing unit commands and data. The read-only memory 18, which may be read by the central processing unit 13, maintains prestored or permanent information including operating, control, evaluation and display programming. The random-access memory 19, which may be written to and read by the central processing unit 13, maintains variable or temporary information including temperature reading data and corresponding time measurement data.

The clock 15 and the timer 16 are operatively connected to an input of the central processing unit 13. The clock 15 generates a timing signal which is sent to the input of the timer 16. The timer 16 generates an output signal representative of the date and time of day which it outputs to the central processing unit 13.

The temperature sensor 10 is disposed within the environment in which temperature is to be measured. The temperature sensor 10 generates an output signal varying as a function of measured temperature and indicative of the actual temperature sensed in the surrounding environment. An analog-to-digital converter 11 is operatively connected to the temperature sensor output 10 and to an input of the central processing unit 13. The converter 11 provides an interface between the temperature sensor 10 and the central processing unit 13 by receiving analog signals from the temperature sensor 10 and converting the signals to digital data which it outputs to the central processing unit 13. The analog-to-digital converter 11 may include an amplifier and a latch or sample hold to lock an instantaneous reading for input to the central processing unit 13.

The two alarm indicators 25 and 26, which may be visual as shown or audible or other type, are also connected to outputs of the central processing unit 13 and are actively operated thereby. As will be described in more detail hereinafter, the current alarm indicator ALARM1 (light 25) is activated when the current measured temperature exceeds a preselected temperature and the past alarm indicator ALARM2 (light 26) is activated when measured temperature has remained on over the preselected temperature for an extended period of time.

Figure 3:
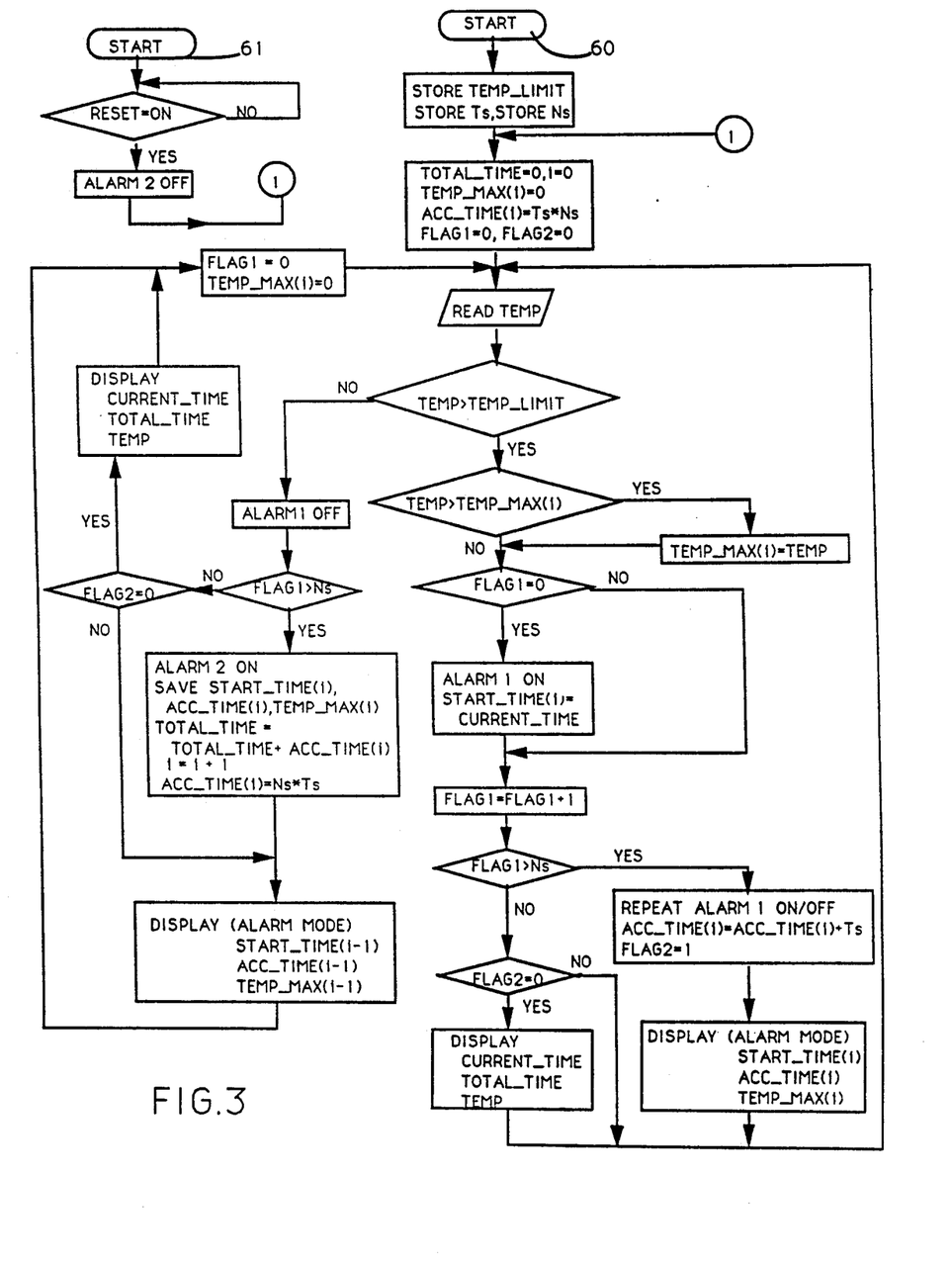
FIG. 3 is a logic flow chart showing one method of operating the temperature monitoring system shown herein; and, FIG. 4 is a graph illustrating typical operation of the temperature monitoring system described herein.

In order to describe the process for operation of the temperature monitoring system as seen in the flow diagram of FIG. 3, certain parameters need to be defined. These parameters, some of which may be entered from or displayed on the control switch and display panel 20 shown in FIG. 2, are as follows:

TEMP: Temperature of the selected environment as currently measured by the temperature sensor;

TEMP_LIMIT: The desired temperature value preselected by the user as a maximum value in the selected environment;

$S_j$: A sequential counter for numbering sampling times, the actual time point when readings are taken to determine the value of TEMP;

$T_s$: The time interval between consecutive sampling times $S_j$, i.e., the period between consecutive temperature measurements;

$N_s$: The number of sampling time intervals in which an alarm will not be found sufficiently significant to store as a past alarm event;

TIME_LIMIT: The amount of ($N_s \times T_s$) required before an alarm condition is found sufficiently significant to store as a past alarm event and activate ALARM2;

i: A sequential counter for numbering each event or alarm period, a period during which TEMP remains greater than TEMP_LIMIT;

CURRENT_TIME: The current date and time of day set by the timer;

START_TIME(i): The date and time of day of $S_j$ when the measured temperature initially exceeds TEMP LIMIT to begin alarm period i;

ACC_TIME(i): The elapsed time from START_TIME(i) to the sampling time $S_j$ when measured temperature TEMP is less than TEMP_LIMIT;

TOTAL_TIME: The sum of all past alarm elapsed times ACC_TIME(i);

TEMP_MAX(i): The maximum measured temperature TEMP during a past alarm period i;

FLAG1: Indicator denoting existence of a present alarm condition and the actual number of previous sampling times when an alarm condition existed;

FLAG2: Indicator denoting the occurrence of a past alarm condition.

In FIG. 2, the display portion 23 of the panel 20 has a series of horizontally arranged alphanumeric arrays, a vertical array of indicator lights, or LEDs, to the left thereof as well as ALARM1 and ALARM2 indicator lights 25 and at the lower right. A first display line array 30 selectively shows either (a) the current date and time or (b) the actual starting time START_TIME of a single past alarm event, the selection of which is indicated by the activation of either of the two associated LEDs 31 and 32. A second display line array 35 shows the event number via indicator 36 and selectively either (a) the total elapsed time TOTAL_TIME of all significant past alarm events, (b) the duration or elapsed time ACC_TIME of a single past alarm event, or (c) the minimum time TIME_LIMIT before a past alarm condition is found significant, the selection of which is indicated by the activation of one of the three associated LEDs 37, 38 and 39. A third display line array 40 selectively shows (a) the current temperature TEMP, (b) the maximum temperature TEMP_MAX measured during a single alarm event, or (c) the maximum desired temperature TEMP_LIMIT, the selection of which is indicated by the activation of one of the three associated LEDs 41, 42 and 43.

As seen in FIG. 2, the display 23 has three alphanumeric data lines, which can be operated in normal, alarm, or adjusting modes. The display 23 is manually switched between all three modes by user operation of the switches as described below. The display 23 is automatically switched between normal and alarm modes by the controller 13 when certain temperature conditions are encountered. In normal mode, the indicators 31, 37 and 41 will be activated so that the current date and time CURRENT_TIME is shown on line 30, TOTAL_TIME is shown on line 35, and the current temperature TEMP is shown on line 40. In alarm mode, the indicators 32, 38 and 42 will be activated as shown in FIG. 2 so that the alarm starting time START_TIME is shown on line 30, the accumulated alarm time ACC_TIME is shown on line 35, and the maximum alarm period TEMP_MAX is shown on line 40.

In adjusting mode, the indicators 31, 39 and 43 will be activated so that the current date and time CURRENT_TIME is shown on line 30, the alarm time limit TIME_LIMIT is shown on line 35, and the preselected temperature value TEMP_LIMIT is shown on line 40.

The alarm indicator ALARM1 is activated to show a current alarm condition. The alarm indicator ALARM1 may be operated in multiple modes, including a minor alarm mode and a major alarm mode, by causing indicator to blink, or optionally to change intensity or color. The alarm indicator ALARM2 is activated to show the past occurrence of a major or significant alarm condition. Specific data detailing past significant alarm conditions may be reviewed from the display by operating the switches as described below.

In FIG. 2, the switch portion 22 of the control switch and display panel 20 includes a power switch 50, which allows a user to turn the unit on and off. The reset switch 52 allows a user to clear all previous temperature and time history data. The adjust switch 53 is used to toggle the display to an adjustment mode permitting entry of the date and time values and user-selected values for TIME_LIMIT and TEMP_LIMIT. The mode switch 55 is used toggle between normal and alarm display modes. The select switch 56 is used during adjustment to move a flicker indicator on the display to the next display location so that the user will view a blinking read-out segment indicating the location at which data which may be modified. The "+" and "−" switches 57 and 58, respectively, are used to increase or decrease the numerical values being adjusted as indicated by the flickering read-out segment. The "+" and "−" switches 57 and 58 can also be used to review alarm history by scrolling temperature/time history forward or backward through event numbers when the panel is operated in alarm mode.

When the temperature monitoring loop 60 is initially started, the user will input a desired temperature TEMP_LIMIT, and, optionally, a sampling time interval $T_s$ and an alarm period TIME_LIMIT by using the input switch unit 22. The central processing unit 13 will then calculate the number of sampling intervals $N_s$ from the values of $T_s$ and TIME_LIMIT and store the entered and calculated values in random-access memory 18. At this time, TOTAL_TIME is set equal to zero, the event counter i is set equal to zero, TEMP_MAX(i) is set equal to zero, ACC_TIME(i) is set equal to the product of $N_s$ times $T_s$, the indicator FLAG1 is set equal to zero, and the indicator FLAG2 is set equal to zero. With all the values thus initialized, the temperature being measured by the sensor 10 is read by the central processing unit 13 and stored as TEMP. Periodically thereafter, the temperature is read at suitable intervals, the length of which is determined by the user in accordance with the particular application.

After each temperature reading, the current TEMP is compared with the user's temperature limit TEMP_LIMIT. If the measured temperature TEMP does not exceed the preselected temperature value TEMP_LIMIT, the current alarm indicator ALARM1 will be deactivated and the indicator FLAG1 will be compared with $N_s$, the number of times the measured temperature has exceeded the preselected temperature value TEMP_LIMIT. If the indicator FLAG1 does not exceed $N_s$ and the indicator FLAG2 is equal to zero, the current time and date CURRENT_TIME, the total elapsed alarm time TOTAL_TIME and the current temperature TEMP are displayed, the indicator FLAG1 is reset to zero, and TEMP_MAX(i) is set equal to zero. Thereafter, the temperature is remeasured.

If the measured temperature TEMP is greater than the preselected temperature value TEMP_LIMIT, the measured temperature TEMP is compared with TEMP_MAX(i) and if TEMP is greater than TEMP_MAX(i), then TEMP_MAX(i) is set equal to TEMP. After TEMP_MAX(i) has been compared and updated, the indicator FLAG1 is compared with zero. If the indicator FLAG1 is equal to zero, i.e., the preselected temperature value TEMP_LIMIT has been exceeded for the first time during this period, the central processing unit replaces the current alarm starting time START_TIME(i) with CURRENT_TIME received from the timer and turns the current alarm indicator ALARM1 on. The indicator FLAG1 is then incremented by one. Thereafter, the indicator FLAG1 is compared to alarm period counter $N_s$. If the indicator FLAG1 is greater than the alarm period counter $N_s$, then the accumulated past alarm time ACC_TIME(i) is incremented by the sampling time interval $T_s$. The current alarm indicator ALARM1 is switched to major alarm mode and is caused to blink. The display 23 is then switched to alarm mode to show the starting time START_TIME(i), the current alarm elapsed time ACC_TIME and the maximum temperature TEMP_MAX(i) as indicated by indicators 32, 38 and 42. Thereafter, the temperature is remeasured.

After the measured temperature reading has dropped so that the currently measured temperature TEMP no longer exceeds the preselected temperature value TEMP_LIMIT, the current alarm indicator ALARM1 is deactivated. If the indicator FLAG1 is greater than $N_s$, the past alarm indicator ALARM2 is activated, the alarm starting time START_TIME(i) is stored in random-access memory, the current alarm time ACC_TIME(i) is stored in random-access memory, the maximum alarm temperature TEMP_MAX(i) is stored in random-access memory, and TOTAL_TIME is incremented by ACC_TIME(i). The event counter i is incremented by one and ACC_TIME(i) is replaced by the value of the product of $N_s$ times $T_s$. The visual display 23 is operated in alarm to mode to show the values for START_TIME, ACC_TIME and TEMP_MAX of the past alarm period i-1. Thereafter, the indicator FLAG1 is reset to zero and TEMP_MAX(i) is reset to zero.

The past alarm indicator ALARM2 can be reset at any time by the user by enabling a reset command via toggle 53 from the input switch unit 22. The central processing unit 13 continually executes an interrupt loop 61 testing whether or not the reset switch 53 has been activated. If the reset is on, the central processing unit 13 will deactivate the past alarm indicator ALARM2 and then enter the temperature monitoring loop 60 at the entry point 1.

In an exemplary environment such as a refrigerator used to store food, the temperature might be kept between 34° and 38°. To prevent any spoilage, the temperature should not exceed 38° for any extended length of time. In such an application, temperature measurements might be taken every minute and high temperatures which exist for less than five minutes or so are probably not harmful. In other applications, temperature samples might be required every 10 seconds, or every 10 minutes, or any other suitable period depending on the specific environment. Alarm periods might be much shorter or much longer. In a freezer for example, sampling times might be every 5 minutes and the minimum alarm period might be one hour, since frozen food in a closed freezer will remain frozen for long periods even though the temperature in the freezer has risen above freezing. Note that most refrigeration systems are closed and temperature rises are typically not quick nor extreme.

Figure 4:
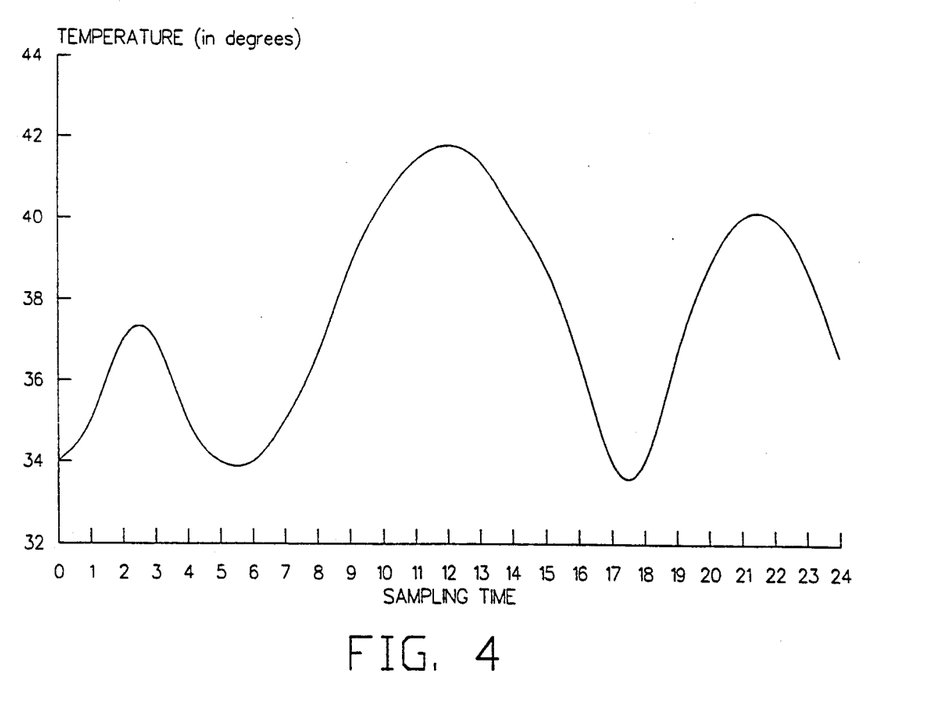

To illustrate operation of the temperature monitoring system during a typical time period when refrigeration may not be working properly, reference should be made to FIG. 4 and to Table A which follows this description. The values set forth in each row of Table A are the values of each of the parameters at each time and temperature shown after all comparisons have been made and just prior to the next temperature reading. In this example, $T_s$ is one minute, $N_s$ is 5, and TEMP_LIMIT is 38°. In a particular refrigerator, the user might desire the thermostat to maintain the temperature between 34° and 38° In such a case the user would want to be warned if the thermostat either fails or allows the temperature to exceed 38° at any time and to be alerted to any past alarm period where the TIME_LIMIT of 5 was exceeded. Exceeding the TIME_LIMIT value of 5 would indicate to the user that a significant past alarm event has occurred. The temperature changes in this example are shown to be more rapid than would occur in a standard refrigeration environment, but are illustrative of the operation of the monitoring system over a relatively short period.

Initially, TOTAL_TIME is set equal to zero, the event counter i is set equal to zero, TEMP_MAX(0) is set equal to zero, ACC_TIME(0) is set equal to the 5 (the product of $N_s$ times $T_s$), the indicator FLAG1 is set equal to zero, and the indicator FLAG2 is set equal to zero.

During the first fluctuating period from sampling time $S_0$ to sampling time $S_5$, the temperature rises from 34° to 37° and then drops back to 34°. During this period, no alarm condition is present since the temperature does not exceed the value of TEMP_LIMIT which has been set at 38°. Therefore, none of the initialized values are adjusted, the indicators FLAG1 and FLAG2 remain set at zero and TEMP_MAX(0) remains set at zero. The display remains in normal display mode.

During the second fluctuating period from sampling times $S_6$ to $S_{17}$, an alarm condition is detected. During this period, the temperature increases from 34° to a high of 42° and then decreases to 34°. During the interval between sampling times $S_6$ and $S_8$, the measured TEMP remains below TEMP_LIMIT, so that none of the initialized values are adjusted, the indicators FLAG1 and FLAG2 remain set at zero and TEMP_MAX(0) remains set at zero.

At sampling time $S_9$, the temperature is measured at 39°. Because TEMP now exceeds TEMP_LIMIT, TEMP is compared with TEMP_MAX(0) and since it exceeds TEMP_MAX(0), 39° is stored in TEMP_MAX(0). Since FLAG1 is equal to zero, the current time 1:09 and date (not shown) are stored in START_TIME(0). At this point, the first alarm indicator ALARM1 is activated to indicate that a current alarm condition has been detected, because the measured temperature TEMP has exceeded the desired temperature limit TEMP_LIMIT. The indicator FLAG1 is set equal to 1. Since FLAG1 does not exceed 5 (the value of $N_s$) and FLAG2 equals zero, the display remains in normal mode and shows the current date and time CURRENT_TIME, the total elapsed alarm time TOTAL_TIME and the current temperature TEMP. During sampling times $S_{10}$ through $S_{12}$, TEMP is continually increasing so that at $S_{12}$ TEMP_MAX(0) is finally set equal to 42° and FLAG1 has increased to 4. The value of START_TIME(0) is unchanged during this time and the status of the first alarm indicator ALARM1 is not changed. During this initial alarm period, a current alarm condition has been detected.

Between sampling time $S_{13}$ and $S_{15}$, the measured temperature TEMP is decreasing, but remains above the TEMP_LIMIT of 38°. During this time interval TEMP_MAX(0) remains unchanged because TEMP does not exceed TEMP_MAX(0) at any of the sampling times. However, at sampling time $S_{14}$, FLAG1 that had been previously increased to a value of causes processing to branch so that the current alarm indicator ALARM1 is switched to blinking major alarm mode, ACC_TIME(0) is updated to a value of 6 (the sum of the previous value of ACC_TIME(0) which was equal to 5 plus the current value of $T_s$ which is equal to 1), and the indicator FLAG2 is set equal to 1 to indicate the occurrence of a significant alarm condition. The display 23 is then operated in alarm mode to show the START_TIME(0) which was 1:09, the current alarm condition or elapsed alarm time ACC_TIME(0) which was 6 and the maximum temperature during the alarm period TEMP_MAX(0) which was 42°. At sampling point $S_{14}$, the current alarm condition is considered to be significant and eventually maintained as a past alarm event, since the measured temperature TEMP has remained above the desired TEMP_LIMIT for more than the predetermined maximum span of time TIME_LIMIT. Although a significant alarm condition has occurred, the past alarm indicator ALARM2 is not yet activated.

At sampling time $S_{16}$, the measured temperature TEMP has dropped to 37° below the desired temperature TEMP_LIMIT of 38°. As a result, the current alarm indicator ALARM1 will be deactivated indicating that the current temperature is now below the desired maximum. Thereafter, processing will branch to those steps which determine whether the past stored history represents a significant alarm event, temperatures remaining over TEMP_LIMIT for an extended length of time. Since FLAG1 is equal to 7, which is greater than 5 (the value of $N_s$), the past alarm indicator ALARM2 is activated and selected alarm values are stored in memory 18. The alarm starting time START_TIME(0), the accumulated elapsed time ACC_TIME(0) and the maximum transferred to random-access memory 18. In addition the total time of all past significant alarm periods TOTAL_TIME is updated by replacing it with the sum of the previous value of TOTAL_TIME plus the value of ACC_TIME(0). Finally, the event counter i is incremented by 1 and set equal to 1 and ACC_TIME(1) is initialized to 5 (the product of $N_s$ times $T_s$). Thereafter, the values of START_TIME(0), ACC_TIME(0) and TEMP_MAX(0) for the most recent significant alarm period are shown on the visual display 23, which remains in alarm mode. Once again, FLAG1 is reset to zero, TEMP_MAX(1) is set equal to zero, and the current measured temperature TEMP is displayed.

At sampling time $S_{17}$, the temperature remains below the value of desired temperature TEMP_LIMIT, so that the indicator FLAG1 remains set at zero and TEMP_MAX(1) remains set at zero.

During the last fluctuating period between sampling times $S_{18}$ and $S_{24}$, a current alarm condition is detected since the temperature surpasses the TEMP_LIMIT of 38° for a short time. The measured temperature TEMP rises from 34° to a high of 40° and then decreases to a final measured temperature of 37°. During sampling periods $S_{18}$ and $S_{19}$, the temperature remains below the value of TEMP_LIMIT, so that none of the initialized values are adjusted with FLAG1 remaining set at zero and TEMP_MAX(1) remaining set at zero.

At sampling time $S_{20}$, the temperature is measured at 39°. Because TEMP now exceeds TEMP_LIMIT, TEMP is compared with TEMP_MAX(1) and since it exceeds TEMP_MAX(1), 39° is stored in TEMP_MAX(1). Since FLAG1 at this point is equal to zero, the time 1:20 and date (not shown) are stored in START_TIME(1) and the current alarm indicator ALARM1 is activated to indicate that a current alarm condition has been detected. The indicator FLAG1 is incremented by one and set equal to 1, and since FLAG1 does not yet exceed 5 (the value of $N_s$), no other values are updated at this time. Since FLAG2 had been set equal to 1 during the second fluctuating period, the display will remain in alarm mode and display time and temperature data from the last significant alarm period. At sampling time $S_{21}$, TEMP has increased to 40° so that at $S_{21}$ TEMP_MAX(1) is set equal to 40° and indicator FLAG1 increased to 2. At sampling time $S_{22}$, the measured temperature has remained at 40° so that TEMP_MAX(1) is not updated. Similarly, the value of START_TIME(1) is unchanged and the status of the first alarm indicator ALARM1 is not changed. The indicator FLAG1 is incremented by one and is set equal to 3.

At sampling time $S_{23}$, the measured temperature TEMP has decreased to 39°, but remains above the TEMP_LIMIT of 38°. At this time, TEMP_MAX(1) is unchanged because TEMP does not exceed TEMP_MAX(1). The value of START_TIME(1) is unchanged and the status of the first alarm indicator ALARM1 is not changed. FLAG1 is thereafter incremented by one and set equal to 4.

At the final shown sampling time $S_{24}$, the measured temperature TEMP has dropped to 37°, which is below the TEMP_LIMIT value of 38°. As a result, the current alarm indicator ALARM1 will be deactivated indicating that current temperature is below the desired maximum. Thereafter, processing branches to determine whether the immediate past history represents a significant past alarm event, i.e., temperatures remaining over TEMP_LIMIT for an extended length of time. Since FLAG1 is equal to 4, which is does not exceed 5, none of the alarm values are stored in memory. Because the indicator FLAG2 is equal to 1, the display will be operated in alarm mode to display START_TIME(0), ACC_TIME(0) and TEMP_MAX(0) for the previous significant alarm period. Then, the indicator FLAG1 is reset to zero and TEMP_MAX(1) is reset equal to zero. Thereafter, the temperature monitoring system continues to operate as described to periodically read and analyze measured temperatures.

Note that the event sequence number, i, is consecutively assigned to each significant past alarm event to uniquely identify the associated temperature and corresponding time data.

At the conclusion of the operating period $S_0$ through $S_{24}$ shown, only one significant past alarm event would have been encountered. The current alarm indicator ALARM1 will be off, the past alarm indicator ALARM2 will be on, and the total time that the measured temperature exceeded the permissible limits would be seven time units, or in this instance, seven minutes.

Industrial Applicability

From the foregoing, it should be apparent that the temperature monitoring system described herein provides an effective and inexpensive means for monitoring temperatures, activating appropriate alarm indicators, and summarizing pertinent temperature history.

Other aspects, objects and advantages of this invention can be obtained from a study of the drawings, the disclosure and the appended claims.

sured temperature has exceeded said predetermined temperature value; and, said controller including means for comparing the duration said measured temperature exceeds said predetermined temperature value with a predetermined time limit and for operating said display means in alarm display mode when the current alarm duration exceeds said predetermined time limit.

2. The temperature monitoring system of claim 1 further including a second alarm indicator connected to said controller and activated to indicate a past alarm condition, said controller including means for activating said second alarm indicator to alarm mode when the alarm duration has exceeded said predetermined time limit and the current measured temperature does not exceed said predetermined temperature value.

TABLE A

| CURR TIME | $S_j$ | TEMP | EVENT i | TEMP _MAX | SAVED START TIME | DISPLAY START TIME | DISPLAY MODE | FLAG 1 | FLAG 2 | ALARM 1 | ALARM 2 | ACC_ TIME | TOTAL _TIME |
|---|---|---|---|---|---|---|---|---|---|---|---|---|---|
| 1:00 | S0 | 34 | 0 | 0 | | | NORMAL | 0 | 0 | OFF | OFF | 5 | 0 |
| 1:01 | S1 | 35 | 0 | 0 | | | NORMAL | 0 | 0 | OFF | OFF | 5 | 0 |
| 1:02 | S2 | 37 | 0 | 0 | | | NORMAL | 0 | 0 | OFF | OFF | 5 | 0 |
| 1:03 | S3 | 37 | 0 | 0 | | | NORMAL | 0 | 0 | OFF | OFF | 5 | 0 |
| 1:04 | S4 | 35 | 0 | 0 | | | NORMAL | 0 | 0 | OFF | OFF | 5 | 0 |
| 1:05 | S5 | 34 | 0 | 0 | | | NORMAL | 0 | 0 | OFF | OFF | 5 | 0 |
| 1:06 | S6 | 34 | 0 | 0 | | | NORMAL | 0 | 0 | OFF | OFF | 5 | 0 |
| 1:07 | S7 | 35 | 0 | 0 | | | NORMAL | 0 | 0 | OFF | OFF | 5 | 0 |
| 1:08 | S8 | 37 | 0 | 0 | | | NORMAL | 0 | 0 | OFF | OFF | 5 | 0 |
| 1:09 | S9 | 39 | 0 | 39 | 1:09 | | NORMAL | 1 | 0 | ON | OFF | 5 | 0 |
| 1:10 | S10 | 40 | 0 | 40 | 1:09 | | NORMAL | 2 | 0 | ON | OFF | 5 | 0 |
| 1:11 | S11 | 41 | 0 | 41 | 1:09 | | NORMAL | 3 | 0 | CN | OFF | 5 | 0 |
| 1:12 | S12 | 42 | 0 | 42 | 1:09 | | NORMAL | 4 | 0 | CN | OFF | 5 | 0 |
| 1:13 | S13 | 41 | 0 | 42 | 1:09 | | NORMAL | 5 | 0 | CN | OFF | 5 | 0 |
| 1:14 | S14 | 40 | 0 | 42 | 1:09 | 1:09 | ALARM | 6 | 1 | BLINK | OFF | 6 | 0 |
| 1:15 | S15 | 39 | 0 | 42 | 1:09 | 1:09 | ALARM | 7 | 1 | BLINK | OFF | 7 | 0 |
| 1:16 | S16 | 37 | 1 | 0 | | 1:09 | ALARM | 0 | 1 | OFF | ON | 5 | 7 |
| 1:17 | S17 | 34 | 1 | 0 | | 1:09 | ALARM | 0 | 1 | OFF | ON | 5 | 7 |
| 1:18 | S18 | 34 | 1 | 0 | | 1:09 | ALARM | 0 | 1 | OFF | ON | 5 | 7 |
| 1:19 | S19 | 37 | 1 | 0 | | 1:09 | ALARM | 0 | 1 | OFF | ON | 5 | 7 |
| 1:20 | S20 | 39 | 1 | 39 | 1:20 | 1:09 | ALARM | 1 | 1 | CN | CN | 5 | 7 |
| 1:21 | S21 | 40 | 1 | 40 | 1:20 | 1:09 | ALARM | 2 | 1 | CN | ON | 5 | 7 |
| 1:22 | S22 | 40 | 1 | 40 | 1:20 | 1:09 | ALARM | 3 | 1 | ON | ON | 5 | 7 |
| 1:23 | S23 | 39 | 1 | 40 | 1:20 | 1:09 | ALARM | 4 | 1 | ON | CN | 5 | 7 |
| 1:24 | S24 | 37 | 1 | 0 | | 1:09 | ALARM | 0 | 1 | OFF | ON | 5 | 7 |

What is claimed is:

1. A temperature monitoring system comprising:
a temperature sensor for measuring the temperature of its surrounding environment;
a timer for generating clock data;
a controller operatively connected to said temperature sensor and said timer, said controller having means for reading temperature measurements at predetermined intervals and having command and data storage means;
input means for entering commands and data for said controller;
display means connected to said controller for indicating time and temperature data, said display means being switchable between a normal display mode indicating the current temperature and an alarm display mode indicating an alarm time and temperature;
a first alarm indicator connected to said con-troller and activated to indicate a current alarm condition;
said controller including means for comparing the current measured temperature with a predetermined temperature value and activating said first indicator to alarm mode when the current measured temperature has exceeded said predetermined temperature value.

3. The temperature monitoring system of claim 2 further including reset means for deactivating said second alarm indicator.

4. The temperature monitoring system of claim 1 wherein said controller includes means for deactivating said first alarm indicator when the current measured temperature is less than said predetermined temperature value.

5. The temperature monitoring system of claim 1 wherein said first alarm indicator has two alarm modes and said controller includes means for activating said first indicator to a first alarm mode when the current measured temperature has exceeded said predetermined temperature value and to a second alarm mode when the current alarm duration has exceeded said predetermined time limit.

6. The temperature monitoring system of claim 1 wherein said controller includes means for initiating an alarm period when the current measured temperature is greater than said predetermined temperature value, means for terminating an alarm period when said current measured temperature is less than said predetermined temperature value, and means for determining a maximum measured temperature during each alarm period.

7. The temperature monitoring system of claim 1 wherein said controller includes means for initiating an alarm period when the current temperature measured by said temperature sensor is greater than said predetermined temperature value, means for terminating an alarm period when the current temperature measured by said temperature sensor is less than said predetermined temperature value, and means for determining the number of elapsed time intervals during each alarm period, said second indicator being activated to denote a past alarm when the current measured temperature does not exceed said predetermined temperature value and the number of elapsed time intervals during the immediate past alarm period exceeds a predetermined number.

8. The temperature monitoring system of claim 7 wherein said controller includes means for determining and storing a maximum temperature measured by said temperature sensor during each past alarm period, the start time received from said timer of each past alarm period, and the duration of each past alarm period.

9. The temperature monitoring system of claim 8 wherein said controller includes means for determining and storing the total elapsed time of all past alarm periods.

10. The temperature monitoring system of claim 1 wherein the display means includes means for receiving data from said controller, said data being stored in said controller and indicating a past alarm period starting time, a past alarm period duration and the maximum temperature during a past alarm period when the display means is in alarm display mode.

11. The temperature monitoring system of claim 10 wherein the display means further includes means for receiving data from said controller, said data being stored in said controller and indicating the total elapsed time of past alarms when the display means is in normal display mode, the total elapsed time being the total duration of all alarm periods which are significant by reason that the measured temperature exceeds said predetermined temperature value for more than a predetermined number of time intervals.

12. The temperature monitoring system of claim 11 wherein the display means has three separate visual arrays for receiving data from said controller, said data being stored in said controller and indicating the current time, the total elapsed time of all significant alarms and the current temperature when the display means is in normal display mode and indicating the starting time of a significant alarm, its duration and the maximum measured temperature during its duration when the display means is in alarm display mode.

13. The temperature monitoring system of claim 12 wherein the display means has an adjusting mode for receiving data from said controller, said data being stored in said controller and indicating the current time, the predetermined temperature value and the predetermined time limit as the user enters data via said input means.

14. The temperature monitoring system of claim 1 wherein said controller comprises a microprocessor for reading, comparing, storing and displaying data and a memory having operating, calculation and display programming and variable data stored therein.

15. The temperature monitoring system of claim 14 wherein said memory comprises read-only memory for storing operating, calculation and display programming used by the microprocessor to control the monitoring system and random-access memory or storing variable data including values set by the user and temperature and time readings.

16. A temperature monitoring system comprising:
sensor means for measuring the actual temperature in the surrounding environment and for generating an output signal varying as a function of measured temperature indicative of the actual temperature sensed;
clock means for generating a timing signal and timer means operatively connected to said clock means indicating the date and time of day and generating output signals representative thereof;
a programmable central processing unit operatively connected to said temperature sensor means and to said clock and timer means to receive input signals therefrom;
memory means operatively connected to said central processor unit for storing central processing unit commands and for storing measured temperature data and corresponding time measurement data, said memory means including read-only-memory means for operating, control, calculation and display programming prestored therein and random-access-memory means for storing temperature and time data;
a visual display means connected to said central processing unit and activated thereby for reviewing stored and computed time and temperature data, said display means including alphanumeric output for viewing the data in readable characters, said display means being switchable between a normal display mode indicating the current time and temperature and an alarm display mode indicating an alarm time and temperature;
current and past alarm indicators connected to and operated by said central processing unit and activated to indicate current and past alarm conditions, respectively;
input switch means connected to said central processing unit for entering commands and data, said input switch means allowing a user to reset the clock and timer and the central processing unit, request display of stored and computed temperature and time data, and enter a selected temperature value;
said central processing unit including means for comparing the current measured temperature with said selected temperature value and activating said current alarm indicator when the current measured temperature is greater than said selected temperature value; and,
said central processing unit including means for comparing the elapsed time said measured temperature exceeds said selected temperature value with a predetermined time limit and operating said display means in alarm display mode when the elapsed time exceeds said predetermined time limit and for subsequently activating said past alarm indicator when the temperature has dropped below said selected temperature value.

17. The temperature monitoring system of claim 16 wherein said controller includes means for initiating an alarm period when the current temperature measured by said temperature sensor is greater than said selected temperature value, means for terminating an alarm period when the current temperature measured by said temperature sensor is less than said selected temperature value, and means for determining a maximum measured temperature during each alarm period.

18. The temperature monitoring system of claim 16 wherein said controller includes means for initiating an alarm period when the current temperature measured by said temperature sensor is greater than said selected temperature value, means for terminating an alarm period when the current temperature measured by said temperature sensor is less than said selected temperature value, and means for determining the number of elapsed time intervals during each alarm period, said past indicator being activated to denote a past alarm when the current temperature measured by said temperature sensor does not exceed said selected temperature value and the number of elapsed time intervals during the immediate past alarm period exceeds a predetermined number.

19. The temperature monitoring system of claim 16 further including interface means operatively connected to said sensor means output for receiving input analog signals from said sensor means, converting the input analog signals to output digital data, and sending the output digital data to an input of said central processing unit.

20. A method for operating a temperature monitoring system to automatically determine high temperature alarm conditions in response to the temperature of the surrounding environment, the method comprising:
predetermining a selected temperature value and a selected time limit;
measuring the temperature of the surrounding environment at predetermined intervals;
activating a first alarm indicator in a first activated mode when the measured temperature initially exceeds said selected temperature value;
determining the starting time of an alarm period when the measured temperature initially exceeds said selected temperature value;
accumulating the elapsed time intervals during which the measured temperature exceeds said selected temperature value after the starting time to determine an alarm period duration;
storing the starting time and the alarm period duration for each alarm period which has a duration greater than said selected time limit;
displaying current temperature data when no alarm condition has been detected, an alarm condition occurring when the measured temperature exceeds said selected temperature value for more than a predetermined number of time intervals; and,
displaying alarm time and temperature data when an alarm condition has been detected.

21. The method of claim 20 further including activating a second alarm indicator when the measured temperature drops below said selected temperature value provided the alarm period duration has exceeded said selected time limit, said second indicator remaining activated until reset.

22. The method of claim 20 further including storing the measured temperature as an alarm period high temperature when the measured temperature exceeds any previously stored high temperature during said alarm period.

23. The method of claim 20 further including accumulating the duration of all alarm periods which have an elapsed time greater than said selected time limit.

24. The method of claim 20 further including deactivating said first alarm indicator when the measured temperature drops below said selected temperature value.

25. The method of claim 20 further including switching said first alarm indicator to a second activated mode when the alarm period duration has exceeded said selected time limit.

26. The method of claim 20 further including initializing the system prior to taking a first temperature measurement by resetting any previously stored high temperature value, elapsed alarm time, and total time of all elapsed alarm times.

27. The method of claim 20 further including resetting the elapsed alarm time and any previously stored high temperature value when the temperature drops below said selected temperature value.

28. A method for operating a temperature monitoring system to automatically determine high temperature alarm conditions in response to the temperature in the surrounding environment, the method comprising:
predetermining a selected temperature value and a selected time limit;
initializing the system by resetting any previously stored high temperature value, elapsed alarm time, and total time of all elapsed past alarm times;
measuring the temperature of the surrounding environment at predetermined sampling intervals;
activating a first alarm indicator to a first activated mode when the measured temperature initially exceeds said selected temperature value to denote an alarm condition;
determining the starting time when the measured temperature initially exceeds said selected temperature value;
storing the measured temperature as an alarm period high temperature when the temperature exceeds any previously stored high temperature;
accumulating the elapsed number of time intervals during which the measured temperature exceeds said selected temperature value to determine an alarm period duration;
switching said first alarm indicator to a second activated mode from said first activated mode when the alarm period duration has exceeded said selected time limit;
activating a second alarm indicator when the measured temperature drops below said selected temperature value provided the alarm period duration has exceeded said selected time limit, said second alarm indicator remaining activated until reset;
deactivating said first alarm indicator when the measured temperature drops below said selected temperature value;
storing the starting time, the alarm period duration and high temperature for each alarm period which had a duration greater than said selected time limit;
resetting the elapsed alarm time and the high temperature value when the temperature drops below said selected temperature value;
displaying current time and temperature data when no alarm condition has been detected; and,
displaying alarm time and temperature data when an alarm condition has been detected.

* * * * *